United States Patent
Watanabe et al.

(10) Patent No.: US 11,121,439 B2
(45) Date of Patent: Sep. 14, 2021

(54) SECONDARY BATTERY

(71) Applicant: Panasonic Corporation, Osaka (JP)

(72) Inventors: Kozo Watanabe, Hyogo (JP); Isao Fujiwara, Hyogo (JP); Kaori Ishikawa, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 304 days.

(21) Appl. No.: 15/363,620

(22) Filed: Nov. 29, 2016

(65) Prior Publication Data

US 2017/0187025 A1 Jun. 29, 2017

(30) Foreign Application Priority Data

Dec. 28, 2015 (JP) .............................. JP2015-256118

(51) Int. Cl.
*H01M 50/579* (2021.01)
*H01M 10/04* (2006.01)
(Continued)

(52) U.S. Cl.
CPC ..... *H01M 50/579* (2021.01); *H01M 10/0413* (2013.01); *H01M 10/0525* (2013.01);
(Continued)

(58) Field of Classification Search
CPC .. H01M 2/0212; H01M 2/027; H01M 2/0272; H01M 2/0285
See application file for complete search history.

(56) References Cited

U.S. PATENT DOCUMENTS 6,040,086 A * 3/2000 Yoshida ................ H01M 2/263
429/161
2010/0279156 A1* 11/2010 Kim ..................... H01M 2/0404
429/56
(Continued)

FOREIGN PATENT DOCUMENTS

JP 2011-119265 6/2011
JP 2012-004099 1/2012
(Continued)

OTHER PUBLICATIONS

Machine translation of JP2014-182993A (Year: 2014).*
(Continued)

*Primary Examiner* — Eric R Smith
(74) *Attorney, Agent, or Firm* — McDermott Will & Emery LLP

(57) ABSTRACT

A secondary battery includes a case composed of a metal containing aluminum as a main component, a stacked electrode assembly arranged in the case, a negative electrode current collector electrically connecting negative electrodes of the stacked electrode assembly to a negative electrode terminal, a positive electrode current collector electrically connecting positive electrodes of the stacked electrode assembly to a positive electrode terminal, a first metal plate arranged between the case and the stacked electrode assembly, and a spacer arranged between the case and the first metal plate, the spacer being composed of an insulating material. The positive electrodes are electrically connected to the case or a second metal plate arranged on the first metal plate with an insulating member provided between the first metal plate and the insulating member. The negative electrode current collector is in contact with the first metal plate to establish electrical connection between the negative electrode current collector and the first metal plate.

12 Claims, 13 Drawing Sheets

(51) Int. Cl.
  *H01M 50/40* (2021.01)
  *H01M 50/116* (2021.01)
  *H01M 10/0525* (2010.01)
  *H01M 10/0585* (2010.01)

(52) U.S. Cl.
  CPC ......... *H01M 50/116* (2021.01); *H01M 50/40* (2021.01); *H01M 10/0585* (2013.01); *H01M 2200/00* (2013.01); *H01M 2220/20* (2013.01); *Y02E 60/10* (2013.01); *Y02T 10/70* (2013.01)

(56) References Cited

U.S. PATENT DOCUMENTS

| | | | |
|---|---|---|---|
| 2012/0264008 A1* | 10/2012 | Okamoto | H01M 2/0404 |
| | | | 429/182 |
| 2013/0149570 A1* | 6/2013 | Han | H01M 2/347 |
| | | | 429/61 |
| 2014/0255737 A1* | 9/2014 | Moon | H01M 2/348 |
| | | | 429/62 |
| 2015/0024264 A1* | 1/2015 | Tononishi | H01M 2/263 |
| | | | 429/186 |

FOREIGN PATENT DOCUMENTS

| | | | |
|---|---|---|---|
| JP | 2013-122910 A | | 6/2013 |
| JP | 2014-112492 A | | 6/2014 |
| JP | 2014182993 A | * | 9/2014 |

OTHER PUBLICATIONS

Definition of "surround", [retrieved from https://www.collinsdictionary.com/dictionary/english/surround on Aug. 17, 2020].*

* cited by examiner

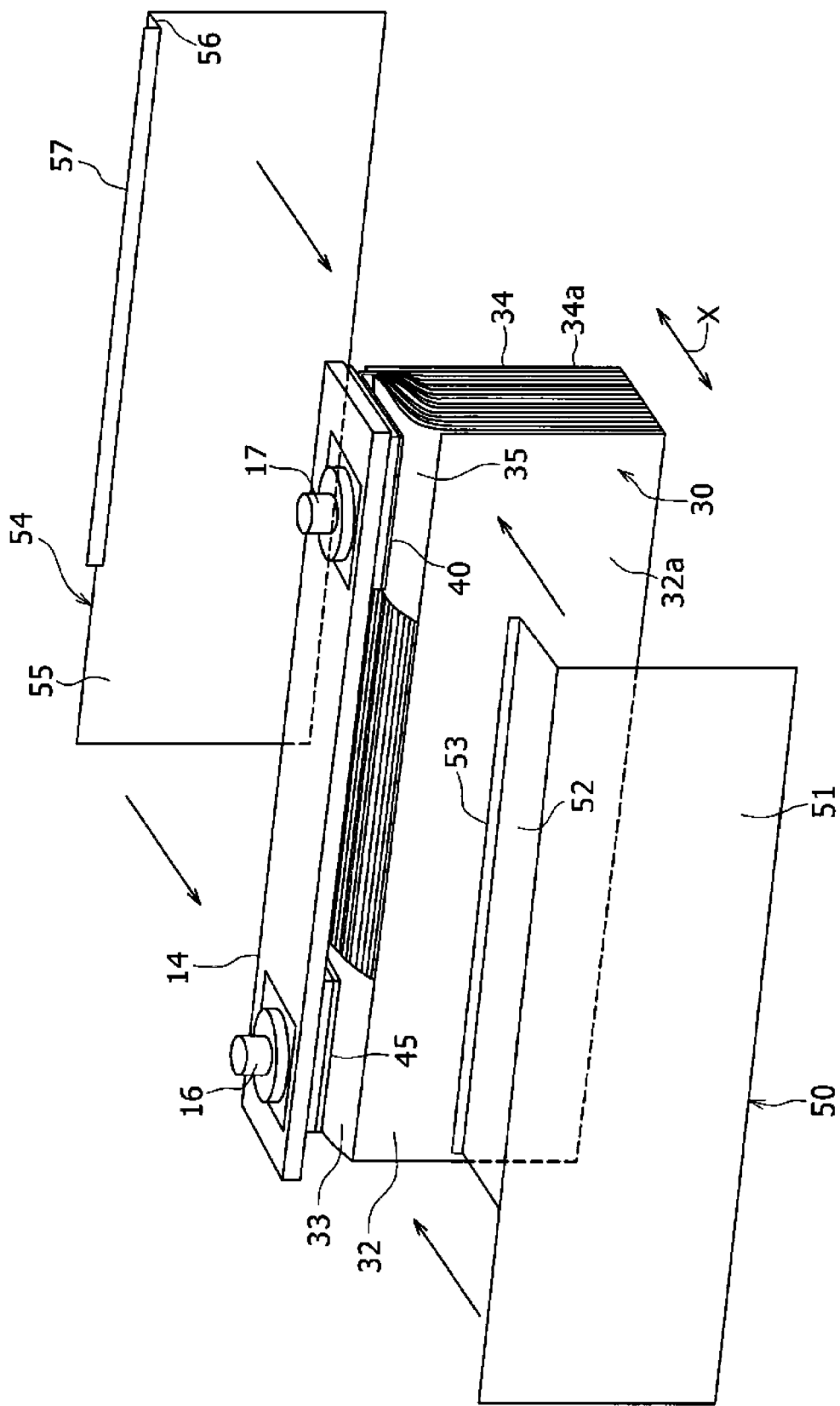

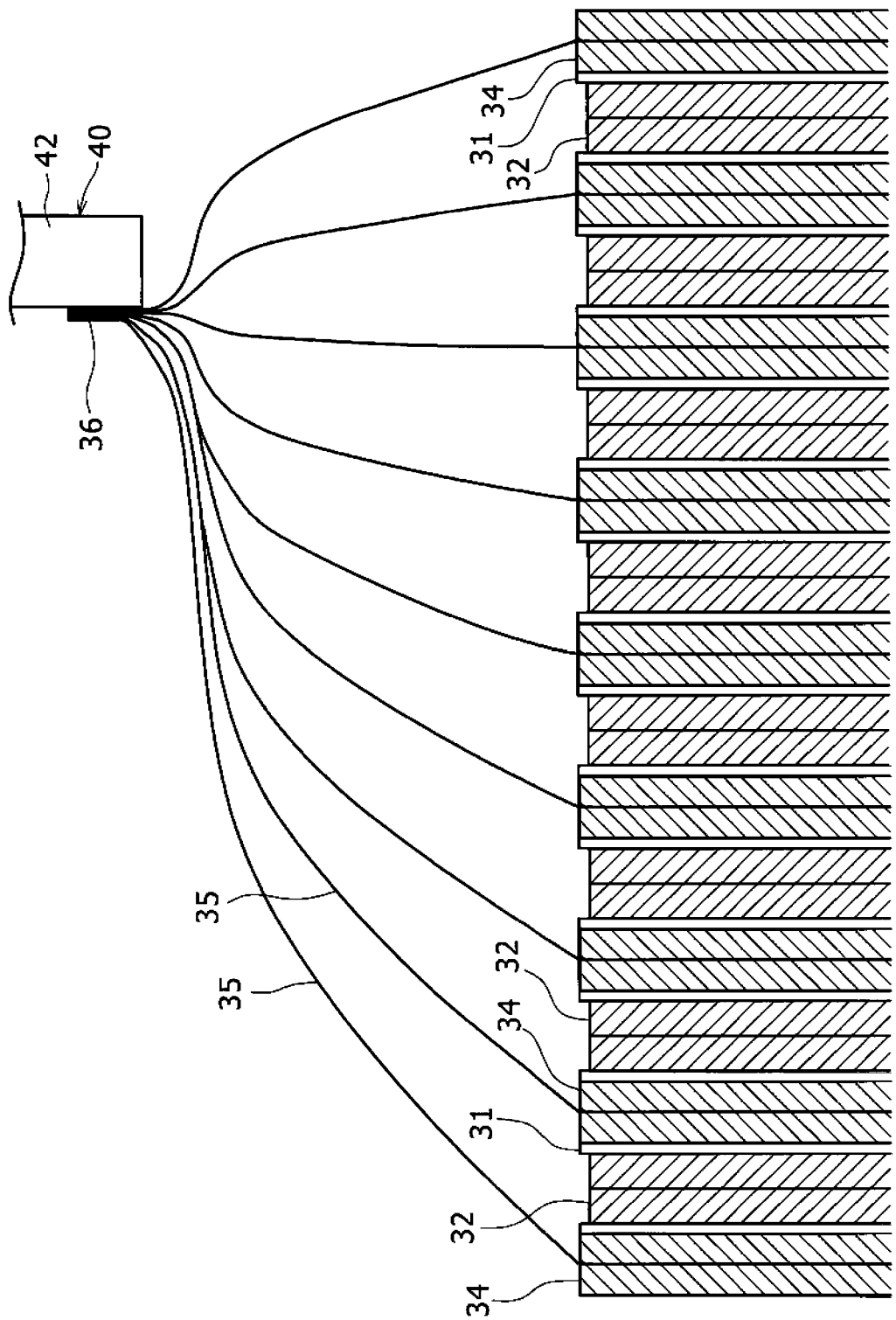

SECONDARY BATTERY

BACKGROUND

1. Technical Field

The present disclosure relates to a secondary battery.

2. Description of the Related Art

Secondary batteries including stacked electrode assemblies in which pairs of electrodes are stacked are known. An example of secondary batteries is a lithium ion battery including positive electrodes, negative electrodes, and separators, the positive electrodes and the negative electrodes being alternately stacked with the separators. In the case of lithium ion batteries having what is called a stacked electrode structure, stresses attributed to expansion and shrinkage of electrodes due to charge and discharge have a tendency to occur uniformly in the direction in which the electrodes are stacked. Thus, for example, strains of electrode assemblies are reduced, and uniformization of battery reactions and longer operating lives of batteries are easily achieved, compared with a wound electrode structure.

Japanese Patent No. 5297441 discloses a secondary battery with a structure including a wound electrode assembly. In this structure, in order to improve nail penetration safety that is defined as safety at the time when a conductive foreign object, such as a nail, penetrates from the outside, a first metal plate (conductive plate) with a relatively large area is welded to a positive electrode uncoated portion arranged at an outer end portion thereof in a direction orthogonal to the winding direction of the electrode assembly. The positive electrode uncoated portion refers to a portion of a positive electrode to which a positive electrode active material is not applied. Japanese Patent No. 5297441 states that when a conductive foreign object penetrates to this structure, the first metal plate is short-circuited to a case to allow the secondary battery to be discharged without catching fire.

Japanese Patent No. 5241813 discloses a secondary battery with a structure including a first conductive plate is welded to an uncoated portion of a first electrode of an electrode assembly, the structure being similar to that described in Japanese Patent No. 5297441. In this structure, a second conductive plate is welded to an uncoated portion of a second electrode. The first electrode and the second electrode are arranged with an insulating plate provided therebetween. Japanese Patent No. 5241813 states that when the secondary battery with this structure is penetrated, the first conductive plate and the second conductive plate are directly electrically short-circuited; hence, heat is negligibly generated at the time of the short circuit.

SUMMARY

Let us suppose that an electrode assembly with a stacked electrode structure is used in each of the secondary batteries disclosed in Japanese Patent Nos. 5297441 and 5241813. The electrode assembly includes positive electrodes and negative electrodes stacked. An electrode tab of the outermost electrode of the electrode assembly in the stacking direction is welded to a metal plate. The electrode tab is not continuous in the stacking direction. In the case where a short circuit is forcibly established by penetration of a foreign object from the outside or application of a stress from the outside, electrical resistance is increased at a connection between the metal plate and the electrode assembly at the time of the forced short circuit to reduce a current flowing to the conductive plate. Thus, the effect of bypassing a short-circuit current may be low. When a particularly large external stress is applied, the electrode tab on a surface is broken to break electrical continuity between the metal plate and a current collector, thereby causing difficulty in providing the effect of bypassing a short-circuit current.

In one general aspect, the techniques disclosed here feature a secondary battery including a case composed of a metal containing aluminum as a main component; a stacked electrode assembly arranged in the case, the stacked electrode assembly including positive electrodes, negative electrodes and separators, the positive electrodes and the negative electrodes being stacked with the separators provided therebetween; a negative electrode current collector; a negative electrode terminal, the negative electrodes being electrically connected to the negative electrode terminal through the negative electrode current collector; a positive electrode current collector; a positive electrode terminal, the positive electrodes being electrically connected to the positive electrode terminal through the positive electrode current collector; a first metal plate arranged between the case and the stacked electrode assembly; and a spacer arranged between the case and the first metal plate, the spacer being composed of an insulating material, the positive electrodes being electrically connected to the case or a second metal plate arranged on the first metal plate with an insulating member, the insulating member being provided between the first metal plate and the second metal plate, and the negative electrode current collector being in contact with the first metal plate to establish electrical connection between the first metal plate and the negative electrode current collector.

According to the one general aspect, in the structure including the stacked electrode assembly, the effect of bypassing a short-circuit current is high at the time of penetration of a foreign object from the outside or application of an external stress. This results in the secondary battery that more safely releases stored energy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2B is an exploded perspective view of the structure illustrated in FIG. 2A at the time when a first metal plate is attached;

FIG. 3B is an enlarged view of portion IIIB of FIG. 3A, the numbers of positive electrodes and negative electrodes being increased;

DETAILED DESCRIPTION

Figure 1:
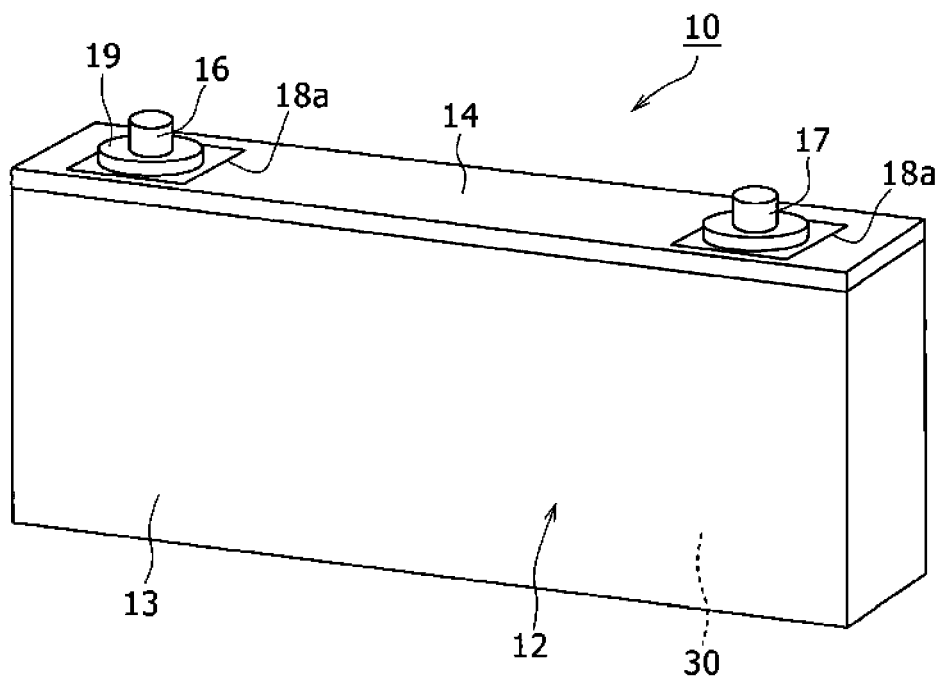
FIG. 1 is a perspective view illustrating the appearance of a secondary battery according to an embodiment.

A secondary battery according to an embodiment will be described in detail below. The drawings to which reference will be made in the Detailed Description are schematically illustrated. For example, the dimensional ratios of constituent elements in the drawings are not always the same as those of the actual objects. Specific dimensional ratios and other features are to be understood from the description provided below. Regarding the term "substantially" used in this specification, when "substantially the same" is taken as an example, the term "substantially the same" is intended to include "perfectly the same" and "essentially the same". The term "end portion" indicates an end of an object and its vicinity. For example, forms, materials, and numbers of elements described below are illustrative and may be changed, depending on the specification of the secondary battery. Hereinafter, the same elements are designated using the same reference numerals.

Secondary batteries described below may be used for power sources for operation of electric vehicles and hybrid electric vehicles, may be used to reduce output fluctuations in solar photovoltaic power generation, wind power generation, and so forth, and may be used in stationary power storage systems for peak-shift operation, in which electricity is stored at night and used during the daytime, of grid-connected power.

Figure 2A:
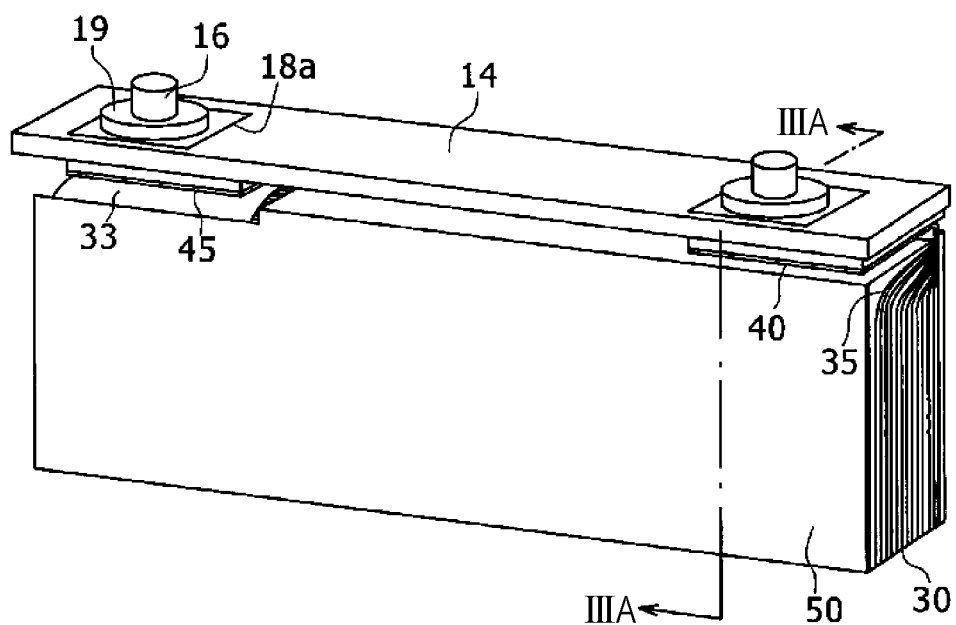
FIG. 2A is a perspective view of a structure obtained by detaching a case main body from the secondary battery illustrated in FIG. 1.
Figure 3A:
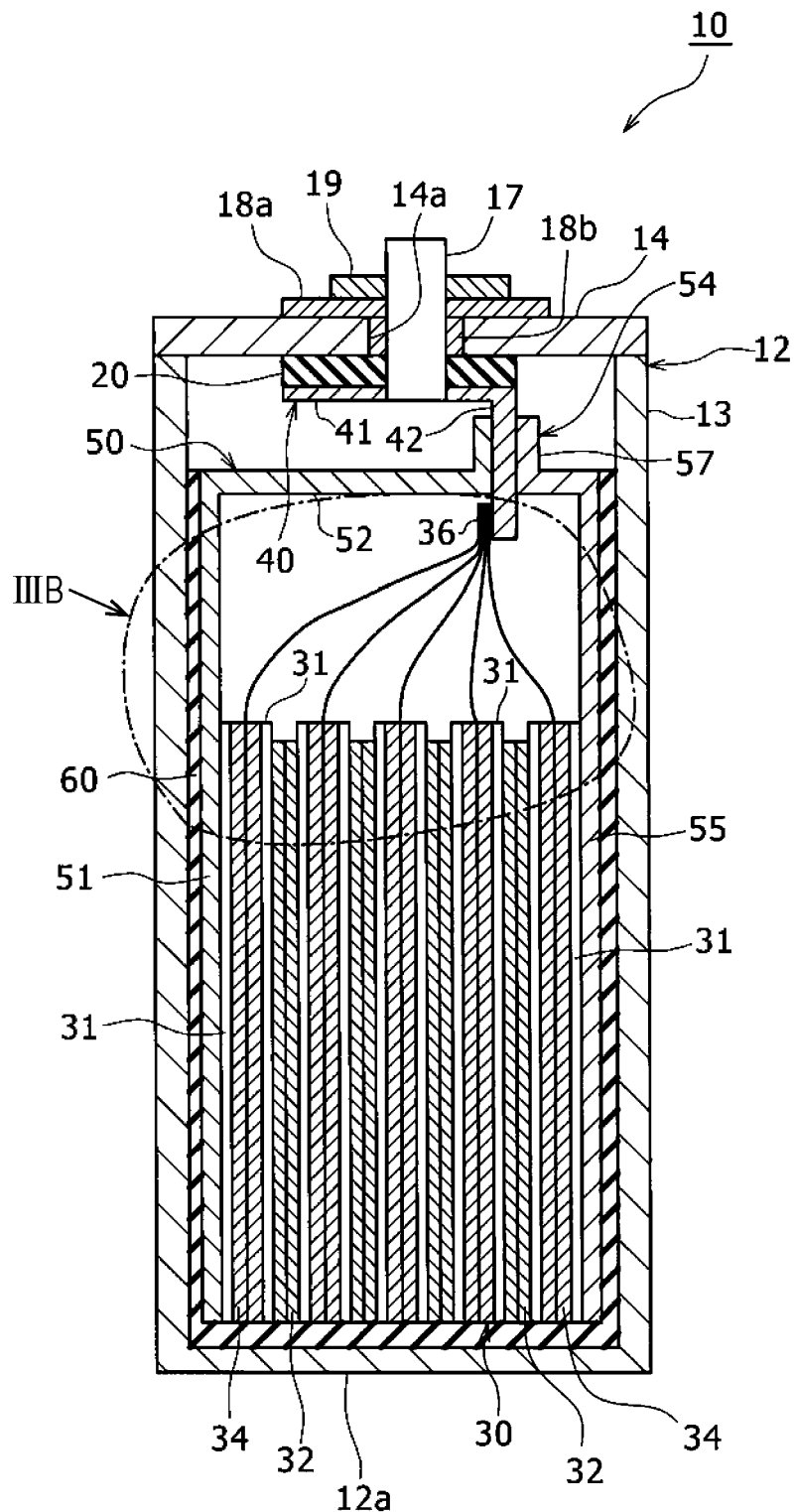
FIG. 3A schematically illustrates a cross section taken along line IIIA-IIIA of FIG. 2A.

A secondary battery 10 according to an embodiment will be described in detail below with reference to FIGS. 1 to 5. FIG. 1 is a perspective view illustrating the appearance of the secondary battery 10. FIG. 2A is a perspective view of a structure obtained by detaching a case main body 13 from the secondary battery 10 illustrated in FIG. 1. FIG. 2B is an exploded perspective view of the structure illustrated in FIG. 2A at the time when a first-side first metal plate 50 and a second-side first metal plate 54 are attached. FIG. 3A schematically illustrates a cross section taken along line IIIA-IIIA of FIG. 2A. FIG. 3B is an enlarged view of portion IIIB of FIG. 3A, the numbers of positive electrodes and negative electrodes being increased. Hereinafter, for convenience of explanation, a side of a case 12 on which a cover plate 14 lies is defined an upper side, and a side of the case 12 opposite that on which the cover plate 14 lies is defined as a lower side.

The secondary battery 10 includes a stacked electrode assembly 30 in which pairs of electrodes are stacked. Specifically, the stacked electrode assembly 30 has what is called a stacked electrode structure in which positive electrodes 32 and negative electrodes 34 are stacked with separators 31 provided therebetween. A porous sheet that has ion permeability and an insulating property is used for each of the separators 31. A desired example of the secondary battery 10 is a lithium ion battery and includes the stacked electrode assembly 30 and a nonaqueous electrolyte as power-generating elements. In this embodiment, the stacked electrode assembly 30 is arranged in the case 12. The case 12 is formed by covering an upper end opening portion of the case main body 13 having a substantially box-like form with the cover plate 14. Each of the case main body 13 and the cover plate 14 is composed of a metal containing aluminum as a main component, as described below. The term "main component" means a component whose content is largest in a substance constituting a positive electrode active material.

In the secondary battery 10, the case 12 is electrically connected to the positive electrodes 32 and the negative electrodes 34. For example, a negative electrode current collector plate 40 connected to the negative electrodes 34 is in contact with the first-side first metal plate 50 and the second-side first metal plate 54 to establish electrical connection between the case 12 and the negative electrodes 34. For example, the case 12 is electrically connected to the positive electrodes 32 by removing an intermediate member 18a, which will be described below, arranged between a portion of a positive electrode terminal 16 protruding from an upper surface of the cover plate 14 and the cover plate 14 or by using the intermediate member 18a partially or entirely composed of a conductive material, such as a metal. A contact portion between the negative electrode current collector plate 40 and the first-side first metal plate 50 will be specifically described below. In this structure, the effect of bypassing a short-circuit current in the stacked electrode assembly 30 is high at the time of when a can or the electrode assembly is deformed by penetration of a conductive foreign object, such as a nail, from the outside of the case 12 into the case 12 or application of an external stress. Thus, stored energy is more safely released.

The positive electrodes 32, the negative electrodes 34, and the separators 31 included in the stacked electrode assembly 30 each have, for example, a substantially rectangular shape in plan. The stacked electrode assembly 30 includes these components stacked and has a substantially rectangular parallelepiped form. As illustrated in FIG. 2B, a positive electrode tab 33 is arranged at an end portion (left end portion) of each of the positive electrodes 32 in a longitudinal direction (right and left direction in FIG. 2B). A negative electrode tab 35 is arranged at an end portion (right end portion) of each of the negative electrodes 34 in the longitudinal direction. In this embodiment, the positive electrode tabs 33 and the negative electrode tabs 35 extend from an end (an upper end of the stacked electrode assembly 30 in FIG. 2B) in a width direction (up and down direction in FIG. 2B) orthogonal to the longitudinal direction of the stacked electrode assembly 30 having a substantially rectangular parallelepiped form.

The positive electrode tabs 33 are gathered and stacked on a side (back side of the paper plane in FIG. 2B) of the stacked electrode assembly 30 in the stacking direction. The negative electrode tabs 35 are gathered and stacked on the side of the stacked electrode assembly 30 in the stacking direction.

Figure 4:
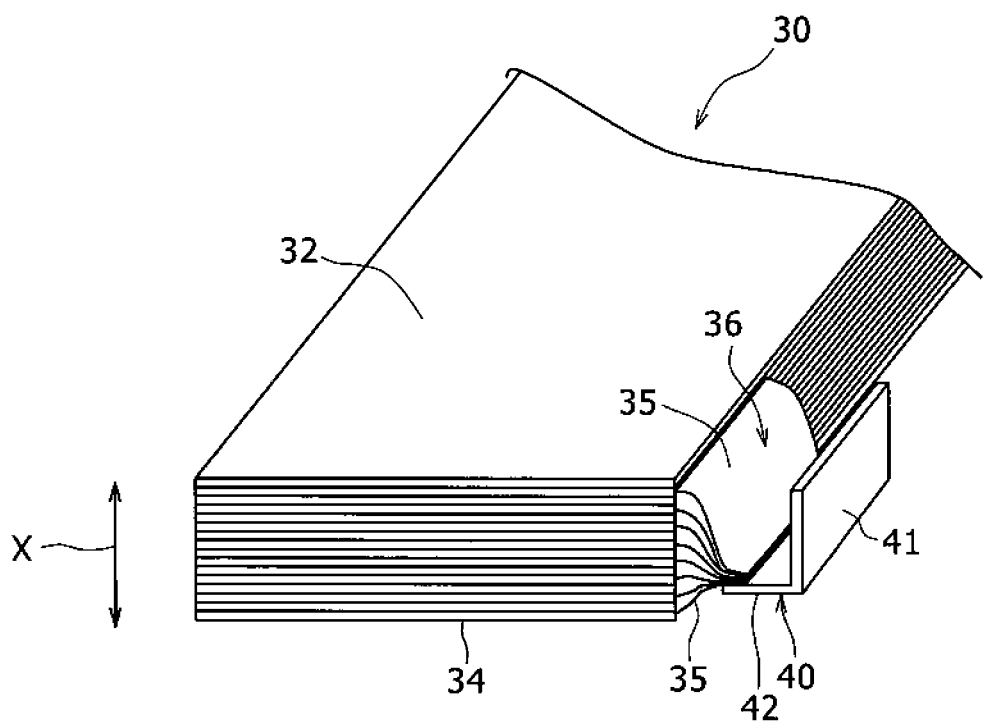
FIG. 4 is a schematic perspective view illustrating a connection between tabs for negative electrodes and a current collector plate in a stacked electrode assembly.

FIG. 4 is a schematic perspective view illustrating a connection between the tabs (negative electrode tabs 35) for the negative electrodes 34 and the negative electrode current collector plate 40 in the stacked electrode assembly 30. Each of the negative electrode tabs 35 extends from an end (right end in FIG. 4) of a corresponding one of the negative electrodes 34 in the width direction (short side direction). The negative electrode tabs 35 are stacked in the stacking direction X of the electrodes to form a stacked tab member 36. The stacked tab member 36 is arranged on and connected to a surface (upper surface of the negative electrode current collector plate 40 in FIG. 4) of the negative electrode current collector plate 40 in the thickness direction.

The negative electrode current collector plate 40 is formed of a metal plate. The negative electrode current collector plate 40 includes an upper end plate portion 41 substantially parallel to the cover plate 14 (FIG. 1) of the case 12 (FIG. 1); and a lower plate portion 42 extending continuously from the upper end plate portion 41 and set at a substantially right angle to the upper end plate portion 41. The negative electrode current collector plate 40 has an L-shaped cross section. The negative electrode current collector plate 40 corresponds to a negative electrode current collector. In this case, the stacked tab member 36 is bonded to a side face (in the thickness direction) of a lower end portion (left end portion in FIG. 4) of the lower plate portion 42 of the negative electrode current collector plate 40 by welding, such as ultrasonic welding. Thus, the negative electrode tabs 35 extending from the end portions of the negative electrodes 34 are gathered and welded to the negative electrode current collector plate 40 to establish electrical connection between the stacked tab member 36 and the negative electrode current collector plate 40. As with the negative electrode tabs 35, the positive electrode tabs 33 are bonded to a positive electrode current collector plate 45 by welding, the positive electrode current collector plate 45 having an L-shaped cross section and being composed of a metal. Thus, the positive electrode tabs 33 extending from the end portions of the positive electrodes 32 are gathered and welded to the positive electrode current collector plate 45 to establish electrical connection between a stack of the positive electrode tabs 33 and the positive electrode current collector plate 45. The positive electrode current collector plate 45 corresponds to a positive electrode current collector.

Each of the positive electrodes 32 includes, for example, a positive electrode base 32a (FIG. 2B) and a positive electrode mixture layer arranged on the positive electrode base 32a. As the positive electrode base 32a, foil composed of a metal such as aluminum stable in the potential range of the positive electrode, a film including a surface layer composed of the metal, or the like may be used. Each of the positive electrode tabs 33 is formed of, for example, a protruding portion of a corresponding one of the positive electrode bases 32a and is integral with the corresponding positive electrode base 32a. Desirably, each of the positive electrode mixture layers contains a conductive material and a binder in addition to the positive electrode active material and is arranged on each surface of each of the positive electrode bases 32a. Each of the positive electrodes 32 may be produced by, for example, applying a positive electrode mixture slurry containing the positive electrode active material, the binder, and so forth to surfaces of a corresponding one of the positive electrode bases 32a, drying the resulting coating films, and subjecting the resulting article to rolling to form the positive electrode mixture layers on both surfaces of the corresponding positive electrode base 32a.

As the positive electrode active material, for example, a lithium-containing composite oxide is used. The lithium-containing composite oxide is not particularly limited and is desirably represented by general formula $Li_{1+x}M_aO_{2+b}$ (where $x+a=1$, $-0.2<x\leq0.2$, $-0.1\leq b\leq0.1$, and M contains at least one of Ni, Co, Mn, and Al). Desired examples of the composite oxide include Ni—Co—Mn-based and Ni—Co—Al-based lithium-containing composite oxides.

Each of the negative electrodes 34 includes, for example, a negative electrode base 34a (FIG. 2B) and a negative electrode mixture layer arranged on the negative electrode base 34a. As the negative electrode base 34a, foil composed of a metal such as copper stable in the potential range of the negative electrode, a film including a surface layer composed of the metal, or the like may be used. Each of the negative electrode tabs 35 is formed of, for example, a protruding portion of a corresponding one of the negative electrode bases 34a and is integral with the corresponding negative electrode base 34a. Desirably, each of the negative electrode mixture layers includes a binder in addition to a negative electrode active material. Each of the negative electrodes 34 may be produced by, for example, applying a negative electrode mixture slurry containing the negative electrode active material, the binder, and so forth to surfaces of a corresponding one of the negative electrode bases 34a, drying the resulting coating films, and subjecting the resulting article to rolling to form the negative electrode mixture layers on both surfaces of the corresponding base.

Any material may be used for the negative electrode active material as long as it can intercalate and deintercalate lithium ions. Typically, graphite is used. Examples of the negative electrode active material that may be used include silicon, silicon compounds, and mixtures thereof. Silicon compounds and carbon materials such as graphite may be used in combination. Silicon compounds can intercalate large amounts of lithium ions, compared with carbon materials such as graphite. Thus, the use of a silicon compound as the negative electrode active material results in a battery with higher energy density. Desired examples of the silicon compound include silicon oxide represented by $SiO_x$ ($0.5\leq x\leq1.5$). Surfaces of particles of the silicon oxide, $SiO_x$, are desirably covered with conductive films composed of, for example, amorphous carbon.

The nonaqueous electrolyte contains a nonaqueous solvent and an electrolyte salt dissolved in the nonaqueous solvent. The nonaqueous electrolyte is not limited to a liquid electrolyte and may be a solid electrolyte containing, for example, a gel-like polymer. Examples of the nonaqueous solvent that may be used include esters, ethers, nitriles, amides, and solvent mixtures of two or more of these solvents. The nonaqueous solvents may include a halogen-substituted solvent in which at least one hydrogen atom of each of the solvents is replaced with a halogen atom, such as a fluorine atom. The electrolyte salt is desirably a lithium salt.

As described above, the case main body 13 and the cover plate 14 included in the case 12 are composed of a metal containing aluminum as a main component. The metal is desirably, for example, aluminum or an aluminum alloy.

Examples of the aluminum alloy include alloys containing aluminum and iron. The case main body 13 is in electrical contact with the cover plate 14 and bonded to the cover plate 14 by welding. The case desirably has a thickness of 50 μm or more and 1 mm or less. At a thickness less than 50 μm, the case can melt at the time of the occurrence of a short circuit to fail to allow a sufficient amount of current to flow to the conductive plate. A thickness more than 1 mm leads to the battery with lower energy density.

The cover plate 14 includes openings 14a into which the positive electrode terminal 16 and a negative electrode terminal 17 are inserted, the openings 14a being located at both end portions of the cover plate 14. The positive electrode terminal 16 and the negative electrode terminal 17 are fixed to the cover plate 14 with the intermediate members 18a and 18b provided therebetween while inserted in the respective openings 14a of the cover plate 14. Upper-side coupling members 19 are fastened to portions of the positive electrode terminal 16 and the negative electrode terminal 17 protruding upward from the cover plate 14 by screw joining or the like. The intermediate members 18a are interposed between the cover plate 14 and the upper-side coupling members 19. The intermediate members 18a and 18b may be formed of gaskets. The negative electrode terminal 17 is insulated from the cover plate 14 by the intermediate members serving as the gaskets. In the case of using the intermediate members 18a and 18b partially or entirely composed of a metal and located on the side of the positive electrode terminal 16, the case 12 and the positive electrode terminal 16 may be electrically connected together.

As illustrated in FIG. 3A, a lower end portion of the negative electrode terminal 17 is bonded to the upper end plate portion 41 of the negative electrode current collector plate 40 by welding to establish electrical connection. An upper end portion of the negative electrode terminal 17 protrudes from the upper surface of the cover plate 14. An insulating member 20 composed of an insulating material such as a resin material is arranged between the upper end plate portion 41 of the negative electrode current collector plate 40 and the cover plate 14 of the case 12.

A current interruption mechanism may be arranged on one or both sides of the side of the negative electrode terminal 17 and the positive electrode terminal 16. As the current interruption mechanism, for example, a pressure-sensitive current interruption mechanism in which a current is interrupted at the time of an increase in internal pressure in the battery may be used. The current interruption mechanism may be arranged in a pathway connecting the positive electrode current collector to the positive electrode terminal. As the current interruption mechanism, for example, a fuse may be used, other than the pressure-sensitive current interruption mechanism.

As described above, the stacked tab member 36 including the negative electrode tabs 35 is electrically connected to the negative electrode current collector plate 40 by welding. Thus, the negative electrodes 34 and the negative electrode terminal 17 are electrically connected to each other through the negative electrode current collector plate 40.

The stack of the positive electrode tabs 33 is electrically connected to the positive electrode current collector plate 45 (FIG. 2B) by welding. Thus, the positive electrodes 32 and the positive electrode terminal 16 are electrically connected to each other through the positive electrode current collector plate 45.

The secondary battery 10 includes the first-side first metal plate 50 and the second-side first metal plate 54 that are arranged between the case 12 and the stacked electrode assembly 30; and a spacer 60 arranged between the case 12 and the first-side first metal plate 50 and between the case 12 and the second-side first metal plate 54, the spacer 60 being composed of an insulating material. The first-side first metal plate 50 is arranged on a first side of the stacked electrode assembly 30 (left side in FIG. 3A). The second-side first metal plate 54 is arranged on a second side of the stacked electrode assembly 30 (right side in FIG. 3A).

As illustrated in FIG. 2B, the first-side first metal plate 50 includes a main body portion 51 having a rectangular shape and an extending portion 52. The extending portion 52 is located at an end of the main body portion 51 in the width direction (upper end of the main body portion 51 in FIG. 2B), extends continuously from a portion of the main body portion 51 excluding an end portion of the main body portion 51 in the longitudinal direction (left end portion of the main body portion 51 in FIG. 2B), extends in the stacking direction X of the stacked electrode assembly 30, and is set at a substantially right angle to the main body portion 51. A contact portion 53 is located at an end of the extending portion 52, extends upward, and is set at a substantially right angle to the extending portion 52.

The second-side first metal plate 54 includes a main body portion 55 having a rectangular shape and an extending portion 56. The extending portion 56 is located at an end of the main body portion 55 in the width direction, extends continuously from a portion of the main body portion 55 excluding an end portion of the main body portion 55 in the longitudinal direction (left end portion in FIG. 2B), extends in the stacking direction X of the stacked electrode assembly 30, and is set at a substantially right angle to the main body portion 55. A contact portion 57 is located at an end of the extending portion 56, extends upward, and is set at a substantially right angle to the extending portion 56. The length of the extending portion 52 of the first-side first metal plate 50 in the stacking direction X is greater than the length of the extending portion 56 of the second-side first metal plate 54 in the stacking direction X.

As illustrated in FIG. 3A, the contact portion 53 of the first-side first metal plate 50 and the contact portion 57 of the second-side first metal plate 54 are in contact with the respective side faces of the lower plate portion 42 of the negative electrode current collector plate 40 in the thickness direction above the stacked tab member 36. As a result, the first-side first metal plate 50 and the second-side first metal plate 54 are connected to the negative electrode current collector plate 40 so as to sandwich both sides of the stacked electrode assembly 30 in the stacking direction. Thereby, the negative electrode current collector plate 40 is electrically connected to each of the first-side first metal plate 50 and the second-side first metal plate 54. For example, each of the first-side first metal plate 50 and the second-side first metal plate 54 is desirably welded to the negative electrode current collector plate 40.

The first-side first metal plate 50 and the second-side first metal plate 54 are composed of the same material as that of the negative electrode base included in the negative electrodes 34 of the stacked electrode assembly 30. For example, in the case where the negative electrode base is composed of copper, the first-side first metal plate 50 and the second-side first metal plate 54 may be composed of copper. Each of the first-side first metal plate 50 and the second-side first metal plate 54 may be composed of another metal material, for example, a stainless-steel alloy or nickel. The thickness of each of the first-side first metal plate 50 and the second-side first metal plate 54 is sufficiently larger than that of the negative electrode base. For example, each of the first-side first metal plate 50 and the second-side first metal plate 54 has a thickness of 50 µm or more and 1 mm or less. At a thickness less than 50 µm, if a short circuit is caused by an external stress, the case can be melted by a short-circuit current to fail to sufficiently provide the effect of bypassing the short-circuit current. At a thickness more than 1 mm, the energy density of the battery may not be sufficiently increased. Each of the main body portion 51 of the first-side first metal plate 50 and the main body portion 55 of the second-side first metal plate 54 is larger than the positive electrode base included in each positive electrode 32 of the stacked electrode assembly 30. The size of each of the main body portion 51 of the first-side first metal plate 50 and the main body portion 55 of the second-side first metal plate 54 may be substantially equal to or smaller than that of the negative electrode base included in each negative electrode 34.

Figure 5:
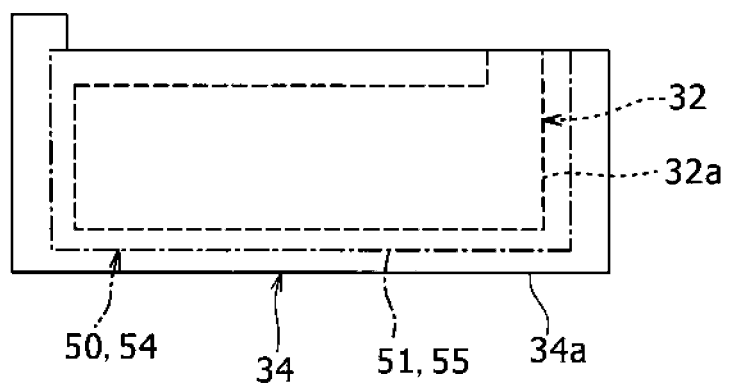
FIG. 5 illustrates an example of the size relationship between a positive electrode and a negative electrode of a stacked electrode assembly.

FIG. 5 illustrates an example of the size relationship among the positive electrodes 32 and the negative electrodes 34 of the stacked electrode assembly 30, the first-side first metal plate 50, and the second-side first metal plate 54. The rectangular-shaped portion of the negative electrode base 34*a* of each negative electrode 34 is desirably larger than the rectangular-shaped portion of the positive electrode base 32*a* of each positive electrode 32. The positive electrode active material layer on each positive electrode base 32*a* desirably has a size such that the negative electrode active material layer on each negative electrode base 34*a* is provided completely over the positive electrode active material layer. Each of the rectangular main body portion 51 of the first-side first metal plate 50 and the rectangular main body portion 55 of the second-side first metal plate 54 is desirably larger than the rectangular portion of each positive electrode base 32*a*. In this case, each of the main body portions 51 and 55 is desirably larger than the rectangular portion of each positive electrode base 32*a* in both of the longitudinal direction and the width direction. In this desired structure, when a nail penetrates from the outside the case 12 (FIG. 1) into the case 12, the nail is prevented from penetrating into the positive electrode 32 without passing through the first-side first metal plate 50 or the second-side first metal plate 54, as described below. Thus, in the stacked electrode assembly 30, the nail is less likely to penetrate through both the positive electrode 32 and the negative electrode 34 and to make a short circuit. From the viewpoint of miniaturizing the rectangular main body portion 51 of the first-side first metal plate 50 and the rectangular main body portion 55 of the second-side first metal plate 54, each of the main body portions 51 and 55 is desirably smaller than each of the rectangular negative electrode bases 34*a*.

The stacked electrode assembly 30 is arranged in an internal space defined by the first-side first metal plate 50 and the second-side first metal plate 54 while the first-side first metal plate 50 and the second-side first metal plate 54 are connected to the negative electrode current collector plate 40. The separators 31 are arranged between the inside surface of the main body portion 51 of the first-side first metal plate 50 and one side surface of the stacked electrode assembly 30 in the stacking direction and between the inside surface of the main body portion 55 of the second-side first metal plate 54 and the other side surface of the stacked electrode assembly 30 in the stacking direction.

The first-side first metal plate 50, the second-side first metal plate 54, and the stacked electrode assembly 30 are arranged in the case 12. The spacer 60 (FIG. 3A) composed of an insulating material such as a resin material is arranged between the outside surface of the main body portion 51 of the first-side first metal plate 50 and an inside surface of the case main body 13 and between the outside surface of the main body portion 55 of the second-side first metal plate 54 and an inside surface of the case main body 13. The spacer 60 is boxy and arranged in such a manner that the electrode assembly and the metal plates are arranged therein. For example, the spacer 60 is formed of a resin film or a resin sheet. In FIGS. 2A and 2B, the spacer is not illustrated. The spacer may have a plate-like form and may be bonded to the first metal plate.

Desirably, the spacer 60 has a melting point of 200° C. or lower and is heat-shrinkable. For example, polypropylene or polyethylene is used for the spacer 60.

In the secondary battery 10 including the stacked electrode assembly 30, the effect of bypassing a short-circuit current is high at the time of penetration of a conductive foreign object, such as a nail, from the outside or application of an external stress. This will be explained below with reference to FIG. 6.

Figure 6:
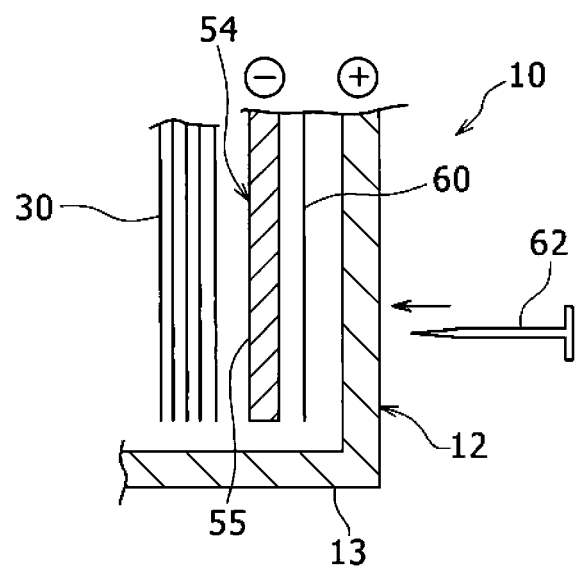
FIG. 6 schematically illustrates a state in which a nail penetrates into a secondary battery from the outside.

FIG. 6 schematically illustrates a state in which a nail 62 penetrates into the secondary battery 10 from the outside of the secondary battery 10. In this embodiment, the case 12 is electrically connected to the positive electrodes. The main body portion 55 of the second-side first metal plate 54 faces an inside surface of the case main body 13 of the case 12 with the spacer 60 provided therebetween. The second-side first metal plate 54 is bonded to the negative electrode current collector plate 40 (FIGS. 3A and 3B). The negative electrode tabs 35 (FIGS. 3A and 3B) extending from the negative electrodes are bonded to the negative electrode current collector plate 40. In this structure, when the nail 62 penetrates from the outside of the case main body 13 and the second-side first metal plate 54, the case 12 and the second-side first metal plate 54 are short-circuited. The second-side first metal plate 54 has relatively large thickness and thus low electrical resistance. Hence, only a small amount of heat is generated at the time of the short circuit between the case 12 and the second-side first metal plate 54, thereby rapidly consuming high current. There is no generation of a large amount of heat due to short circuits of the positive electrodes and the negative electrodes of the stacked electrode assembly 30. The stored energy is safely released through a short-circuit path between the case 12 and the second-side first metal plate 54. The above section has described the second-side first metal plate 54. The same is true of the first-side first metal plate 50 (FIG. 3A).

In the structure described in Japanese Patent No. 5297441 or 5241813, the conductive plate is fixed by welding to the outer end portion of the positive electrode uncoated portion of a thin metal film serving as the positive electrode or negative electrode of the electrode assembly in a direction orthogonal to the winding direction. Such a structure is basically used for the wound electrode assembly. In the case where the structure is used for the stacked electrode assembly as described in the embodiment, the conductive plate is welded to only a single thin metal film. In this case, electrical resistance is increased between the conductive plate and other thin metal films, such as the positive electrodes or negative electrodes. Thus, when a nail penetrates into the conductive plate from the outside, electrical resistance is increased at a connection between a short-circuited point and the electrode assembly at the time of the forced short circuit to reduce a current flowing to the conductive plate. Thus, the effect of bypassing a short-circuit current may be low, thereby possibly increasing the amount of heat generated inside the battery. Regarding this problem, in the structure including the stacked electrode assembly 30 according to the foregoing embodiment, when a nail penetrates into the structure from the outside, the effect of bypassing a short-circuit current is high. Thus, the foregoing problem is prevented. In the case where a short circuit between, for example, the case and the conductive plate is forcibly established by, for example, deformation of a can due to an external stress, when the structure described in Japanese Patent No. 5297441 or 5241813 is used for the stacked electrode assembly, the thin metal film welded to the conductive plate can be broken, or a connection between the thin metal film and the conductive plate can be detached. Regarding this problem, in the structure including the stacked electrode assembly 30 according to the foregoing embodiment, the effect of bypassing a short-circuit current is high even at the time of the short circuit due to the external stress.

In this embodiment, the spacer 60 may have a melting point of 200° C. or lower and may be heat-shrinkable. In this case, when the nail 62 penetrates into the first-side first metal plate 50 and the second-side first metal plate 54 while passing through the spacer 60 to forcibly establish a short circuit, a through hole formed in the spacer 60 is easily increased in size because of the shrinkage of the spacer 60 due to heat generated at the time of the short circuit. Thus, the spacer 60 is less likely to interfere with the forced short circuit.

Figure 7A:
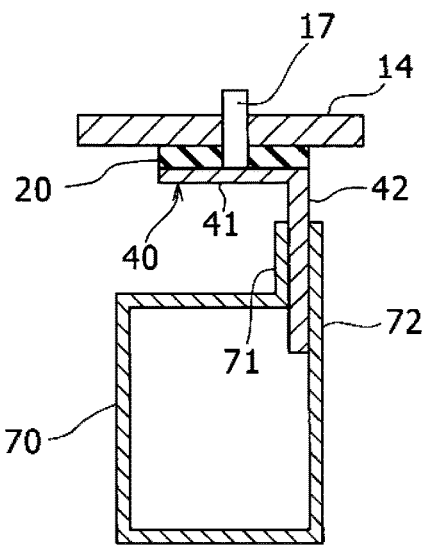
FIG. 7A schematically illustrates another example of a connection structure between a negative electrode current collector and a first metal plate.
Figure 7B:
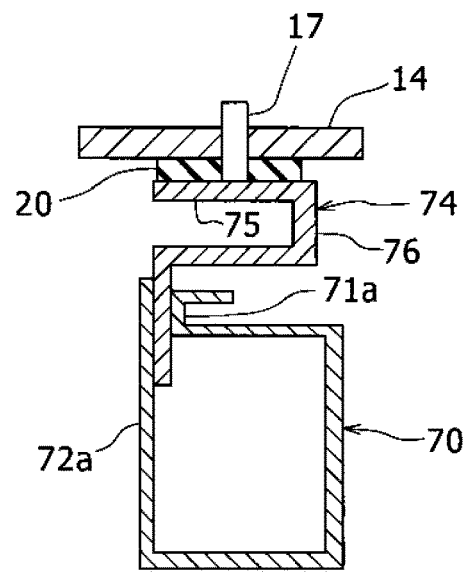
FIG. 7B schematically illustrates another example of a connection structure between a negative electrode current collector and a first metal plate.
Figure 7C:
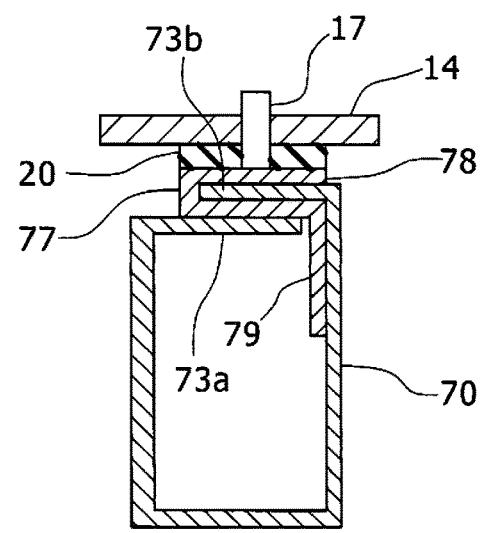
FIG. 7C schematically illustrates another example of a connection structure between a negative electrode current collector and a first metal plate.

Other examples of a connection structure between the negative electrode current collector plate 40 and a first metal plate 70 will be described with reference to FIGS. 7A to 7C which are schematic views. In each of the examples illustrated in FIGS. 7A to 7C, a single first metal plate 70 has a tubular structure. The lower plate portion 42 of the negative electrode current collector plate 40 is sandwiched between and bonded to both end portions of the first metal plate 70 in the circumferential direction by welding. The stacked electrode assembly 30 (see FIG. 3A) is arranged in the tubular portion of the first metal plate 70. In the example illustrated in FIG. 7A, a bent portion 71 arranged in one end portion of the first metal plate 70 in the circumferential direction is bonded to one side face of the lower plate portion 42 (left side face of the lower plate portion 42 in FIG. 7A). An upper end portion of a flat section 72 included in the tubular portion of the first metal plate 70 and located on the side of the other end portion of the first metal plate 70 in the circumferential direction is bonded to the other side face of the lower plate portion 42 (right side face of the lower plate portion 42 in FIG. 7A).

In the example illustrated in FIG. 7B, a negative electrode current collector plate 74 includes an upper end plate portion 75 and a lower end plate portion 76 arranged below the upper end plate portion 75, the lower end plate portion 76 being bent at substantially right angles in two places to have a crank shape in section. An upper end portion of a flat section 72a included in the tubular portion of the first metal plate 70 and located on the side of one end portion of the first metal plate 70 in the circumferential direction is bonded to one side face of the lower end plate portion 76 (left side face of the lower end plate portion 76 in FIG. 7B). A bent portion 71a arranged on the side of the other end portion of the first metal plate 70 in the circumferential direction is bonded to the other side face of the lower end plate portion 76 (right side face of the lower end plate portion 76 in FIG. 7B). An upper end portion of the bent portion 71a is bent outward at a substantially right angle.

In the example illustrated in FIG. 7C, a negative electrode current collector plate 77 includes an upper end plate portion 78 and a lower end plate portion 79 arranged below the upper end plate portion 78, the lower end plate portion 79 being bent at substantially right angles in two places to have a crank shape in section. Flat sections 73a and 73b in both end portions of the first metal plate 70 in the circumferential direction, the flat sections 73a and 73b being arranged substantially parallel to each other, are bonded to a lower side face and an upper side face, respectively, of an intermediate section of the lower end plate portion 79, the intermediate section extending parallel to the upper end plate portion 78. The flat section 73b in an end portion of the first metal plate 70 in the circumferential direction is sandwiched between the intermediate section of the lower end plate portion 79 and the upper end plate portion 78.

Figure 8:
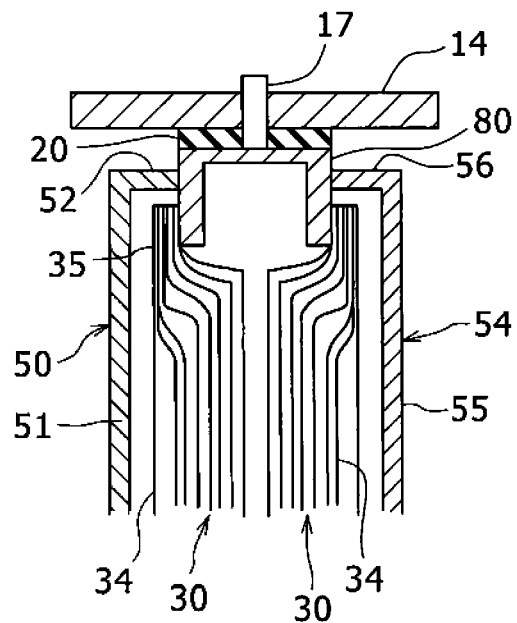
FIG. 8 schematically illustrates another example of a connection structure between a negative electrode current collector and a first metal plate.

FIG. 8 schematically illustrates another example of a structure of a connection among a negative electrode current collector 80, the first-side first metal plate 50, and the second-side first metal plate 54. The negative electrode current collector 80 has an inverted U shape. The negative electrode terminal 17 is connected to an upper end of the negative electrode current collector 80. Ends of the extending portions 52 and 56 located at the upper end portions of the first-side first metal plate 50 and the second-side first metal plate 54 are bonded to outer side faces of the negative electrode current collector 80 so as to sandwich the negative electrode current collector 80. The contact portion 53 or 57 (see FIG. 3A) set at a substantially right angle to the extending portion 52 or 56 is not arranged in end portions of the extending portions 52 and 56 of the first-side first metal plate 50 and the second-side first metal plate 54. The contact portion 53 and 57 may be arranged.

Two stacked electrode assemblies 30 are arranged inside the main body portions 51 and 55 of the first-side first metal plate 50 and the second-side first metal plate 54 so as to face the main body portions 51 and 55. In FIG. 8, only the negative electrodes 34 of the stacked electrode assemblies 30 are illustrated. The negative electrode tabs 35 extending from the upper end portion of each of the negative electrodes 34 are gathered, stacked, and bonded to a corresponding one of the outer side faces of the negative electrode current collector 80.

Figure 9:
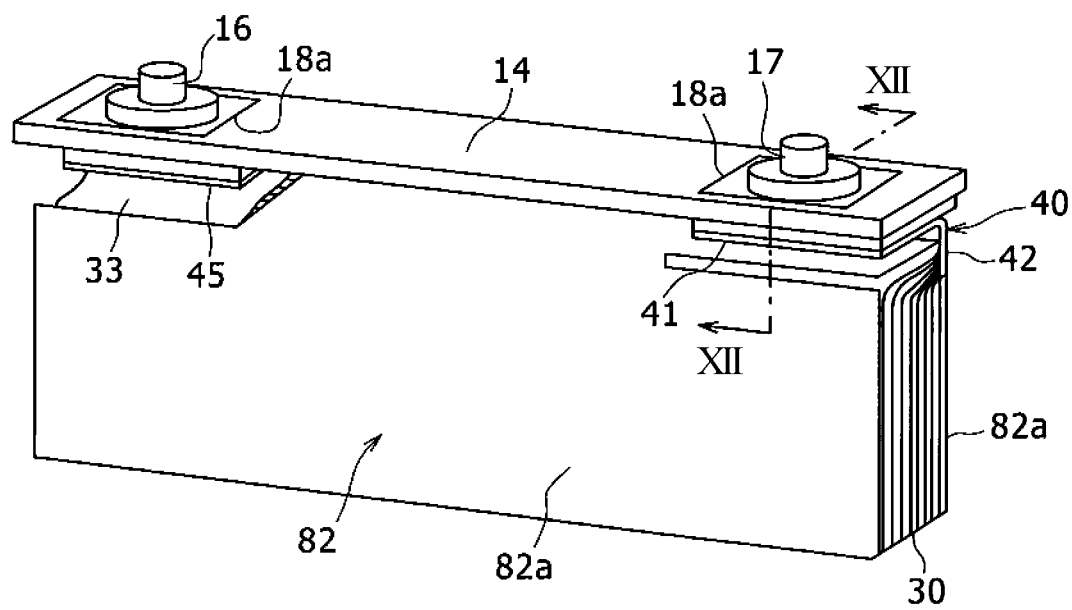
FIG. 9 is a perspective view illustrating another embodiment and corresponds to FIG. 2A.
Figure 10:
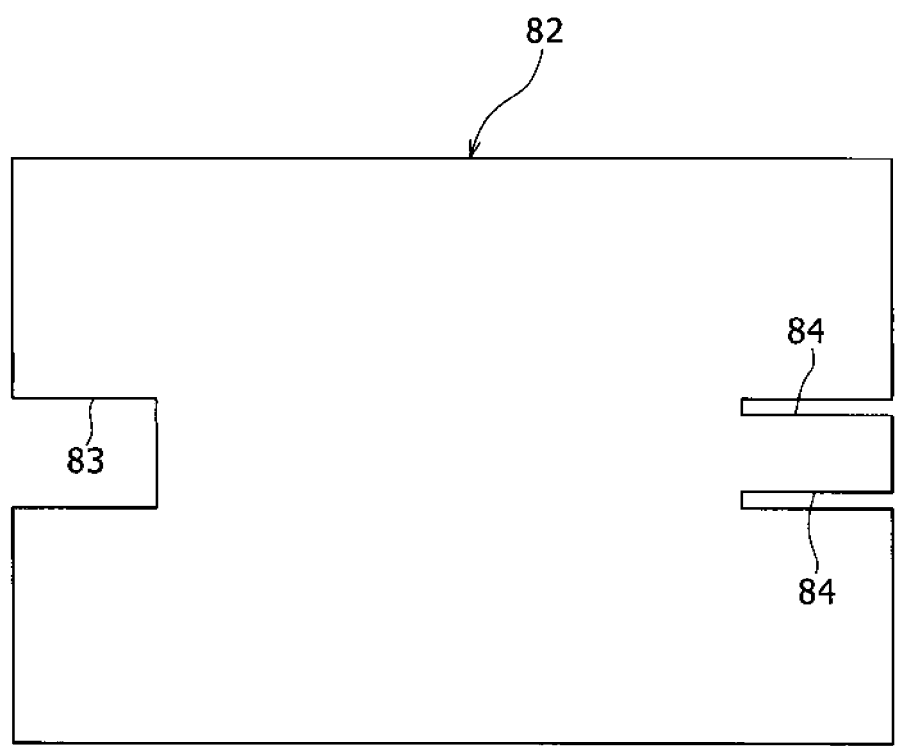
FIG. 10 is a developed view of a first metal plate used in a structure illustrated in FIG. 9.
Figure 11:
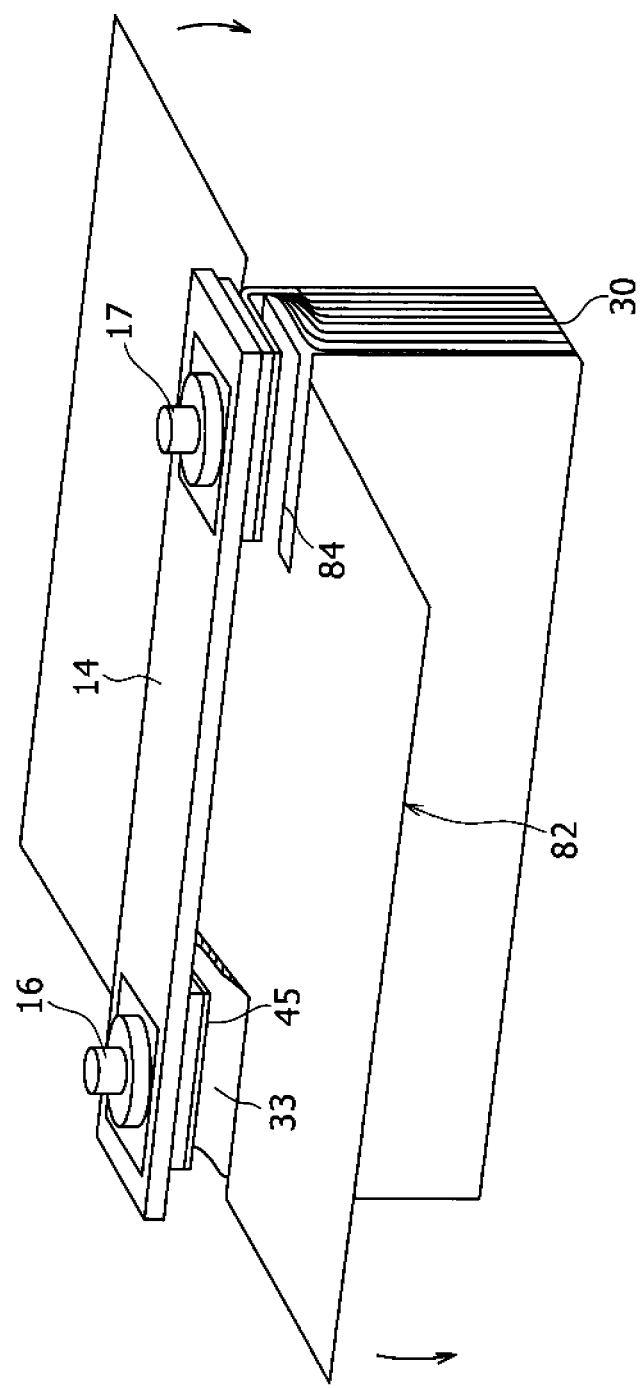
FIG. 11 is a perspective view illustrating a state in which the first metal plate is arranged between a stacked electrode assembly and a cover plate in the structure illustrated in FIG. 9.
Figure 12:
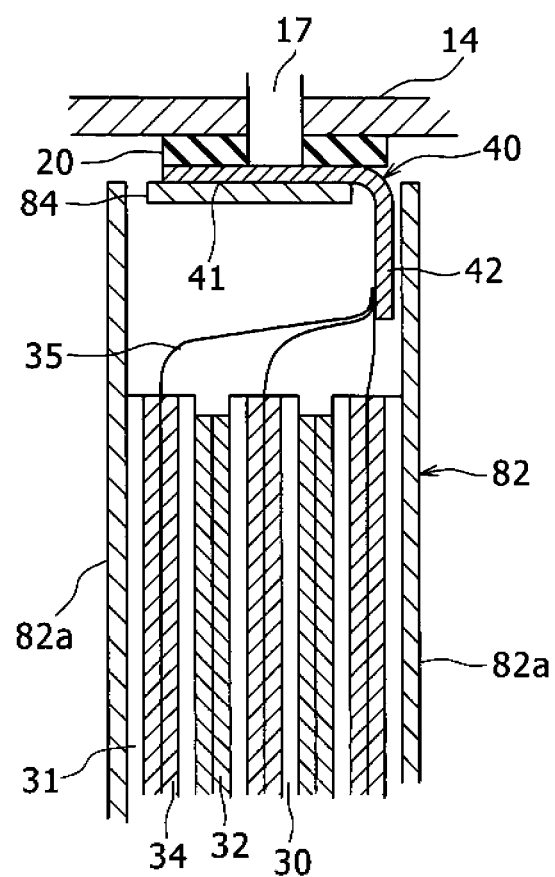
FIG. 12 schematically illustrates a cross section taken along line XII-XII of FIG. 9.

Another embodiment will be described below with reference to FIGS. 9 to 12. FIG. 9 is a perspective view illustrating this embodiment and corresponds to FIG. 2A. FIG. 10 is a developed view of a first metal plate 82 used in a structure illustrated in FIG. 9. FIG. 11 is a perspective view illustrating a state in which the first metal plate 82 is arranged between the stacked electrode assembly 30 and the cover plate 14 in the structure illustrated in FIG. 9. FIG. 12 schematically illustrates a cross section taken along line XII-XII of FIG. 9.

In the structure according to this embodiment, a secondary battery includes a single sheet of the first metal plate 82 in place of the first-side first metal plate 50 and the second-side first metal plate 54 used in the structure illustrated in FIGS. 1 to 6. Specifically, the first metal plate 82 is formed by bending a flat metal sheet into a U-shape. The first metal plate 82 is arranged so as to cover upper end faces of the stacked electrode assembly 30 and both side faces of the stacked electrode assembly 30 in the stacking direction.

As illustrated in FIG. 10, the first metal plate 82 has a flat, substantially rectangular shape in a developed view. In the developed view, a cut portion 83 is arranged at one end portion of the first metal plate 82 in the longitudinal direction (left end portion of the first metal plate 82 in FIG. 10) in order not to interfere with the positive electrode terminal 16 and its peripheral portion. In the developed view, two slit portions 84 extending substantially parallel to the longitudinal direction and each having small width are arranged at an intermediate section of the other end portion of the first metal plate 82 in the longitudinal direction (right end portion of the first metal plate 82 in FIG. 10). The cut portion 83 and the slit portions 84 facilitate the bending of the first metal plate 82 in a developed state into a U-shape. The lower plate portion 42 of the negative electrode current collector plate 40 is inserted into one of the two slit portions 84. A portion of the first metal plate 82 between the slit portions 84 is bonded to the upper end plate portion 41 while the state of the lower plate portion 42 is maintained.

As illustrated in FIG. 11, both side portions of the first metal plate 82 are bent downward so as to be set at substantially right angles while the intermediate section is interposed between the cover plate 14 and the stacked electrode assembly 30 in the developed state, so that the stacked electrode assembly 30 is surrounded by the first metal plate 82. Portions of the first metal plate 82 arranged on the outside of the stacked electrode assembly 30 in the stacking direction serve as main body portions 82a. The separators 31 (FIG. 12) are sandwiched between the main body portions 82a and the stacked electrode assembly 30. Accordingly, the first metal plate 82 extends over the entire length of the stacked electrode assembly 30 in the stacking direction on the side of the upper portion of the stacked electrode assembly 30 adjacent to the positive electrode terminal 16 and the negative electrode terminal 17. The remaining components in the structure and their effects are the same as those of the structure illustrated in FIGS. 1 to 6.

Figure 13A:
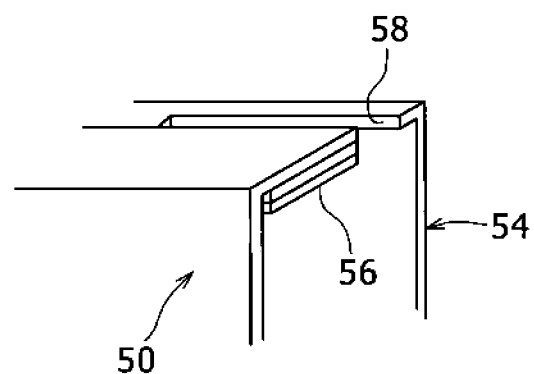
FIG. 13A is a perspective view illustrating another example of a structure of a connection of a first metal plate.
Figure 13B:
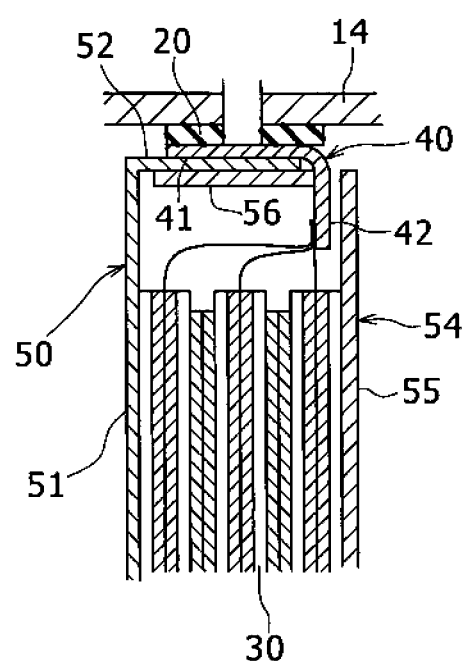
FIG. 13B illustrates a structure in which a stacked electrode assembly is arranged in the first metal plate illustrated in FIG. 13A and corresponds to FIG. 12.

FIG. 13A is a perspective view illustrating another example of a connection structure of the first-side first metal plate 50 and the second-side first metal plate 54. FIG. 13B illustrates a structure in which the stacked electrode assembly 30 is arranged in the first-side first metal plate 50 and the second-side first metal plate 54 illustrated in FIG. 13A and corresponds to FIG. 12.

In the structure of the another example illustrated in FIGS. 13A and 13B, the extending portions 52 and 56 located at the upper end portions of the first-side first metal plate 50 and the second-side first metal plate 54, the extending portions 52 and 56 being arranged parallel to the upper end plate portion 41 of the negative electrode current collector plate 40, are vertically stacked on the upper end plate portion 41. A slit portion 58 is arranged in an end portion of the extending portion of the second-side first metal plate 54 in the longitudinal direction (right end portion of the extending portion in FIG. 13A). The lower plate portion 42 of the negative electrode current collector plate 40 is inserted into the slit portion 58. The upper end plate portion 41 is bonded to an upper face portion of the extending portion 52 of the first-side first metal plate 50. An upper face portion of the extending portion 56 of the second-side first metal plate 54 is bonded to a lower face portion of the extending portion 52 of the first-side first metal plate 50. The resulting member including the first-side first metal plate 50 and the second-side first metal plate 54 extends over the entire length of the stacked electrode assembly 30 in the stacking direction on the side of the upper portion of the stacked electrode assembly 30. The remaining components in the structure and their effects are the same as those of the structure illustrated in FIGS. 1 to 6.

In the structure illustrated in FIGS. 13A and 13B, a tubular structure obtained by processing a single first metal plate may be used in place of the first-side first metal plate 50 and the second-side first metal plate 54. In this case, the stacked electrode assembly 30 is arranged inside the tubular portion of the first metal plate.

Figure 14:
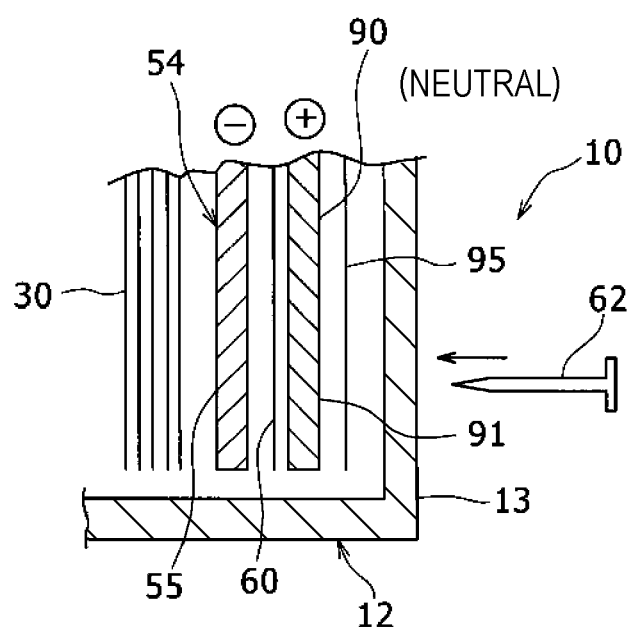
FIG. 14 illustrates another embodiment and corresponds to FIG. 6.

FIG. 14 illustrates another embodiment and corresponds to FIG. 6. In this embodiment, the case 12 is not electrically connected to the positive electrodes in the structure illustrated in FIGS. 1 to 6. Instead, a first-side second metal plate (not illustrated) is arranged between the case 12 and the first-side first metal plate 50 (not illustrated), and a second-side second metal plate 90 are arranged between the case 12 and the second-side first metal plate 54. FIG. 14 illustrates an end portion of the secondary battery not adjacent to the first-side first metal plate 50 but adjacent to the second-side first metal plate 54. Hereinafter, the second-side first metal plate 54 is also referred to as a "first metal plate 54", and the second-side second metal plate 90 is also referred to as a "second metal plate 90".

The second metal plate 90 is arranged outside the first metal plate 54 (right side of the second-side first metal plate 54 in FIG. 14) with an insulating member 95 provided therebetween. The insulating member 95 is formed of, for example, a resin film or a resin sheet. As with the first metal plate 54, the second metal plate 90 includes a flat, main body portion 91. An extending portion (not illustrated) is arranged at an end of the main body portion 91 in the width direction (upper end of the main body portion 91 in FIG. 14) and at an end portion of the main body portion 91 in the longitudinal direction so as to extend in the stacking direction of the stacked electrode assembly 30. As with the first metal plate 54, a contact portion is arranged at an end of the extending portion. The contact portion of the second metal plate 90 is bonded by welding to a positive electrode current collector plate to establish electrical connection between the positive electrodes and the second-side second metal plate 90. The same is true of the first-side second metal plate, except that the first-side second metal plate is bonded to a different side of the positive electrode current collector plate. The insulating members 95 are interposed between the case 12 and the second-side second metal plate 90 and between the case 12 and the first-side second metal plate.

The second metal plate 90 is composed of the same material as that of the positive electrode base included in the positive electrodes of the stacked electrode assembly 30. For example, in the case where the positive electrode base is formed of aluminum foil, each of the second metal plates may be composed of aluminum. Each of the second metal plates has sufficiently larger thickness than the positive electrode base. For example, desirably, each of the second metal plates has a thickness of 50 μm or more and 1 mm or less and is larger than that of each first metal plate. Desirably, a rectangular main body portion of each of the second metal plates is larger than the positive electrode base and smaller than the negative electrode base included in each of the negative electrodes.

In this structure, the case 12 serves as a neutral electrode. When the nail 62 penetrates into the case 12 from the outside, the nail 62 passes through the first metal plate 54 and the second metal plate 90, thereby establishing a forced short circuit. This enhances the effect of bypassing a short-circuit current, so that energy is safely released at the time of the short circuit. The remaining components in the structure and their effects are the same as those of the structure illustrated in FIGS. 1 to 6. The first metal plate 54 and the second metal plate 90 may be inversely arranged in the stacking direction of the stacked electrode assembly 30.

A secondary battery according to the present disclosure is not limited to the foregoing embodiments. For example, the secondary battery has a structure described in any of items below.

Item 1

A secondary battery includes:

a case composed of a metal containing aluminum as a main component;

a stacked electrode assembly arranged in the case, the stacked electrode assembly including positive electrodes, negative electrodes and separators, the positive electrodes and the negative electrodes being stacked with the separators provided therebetween;

a negative electrode current collector;

a negative electrode terminal, the negative electrodes being electrically connected to the negative electrode terminal through the negative electrode current collector;

a positive electrode current collector;

a positive electrode terminal, the positive electrodes being electrically connected to the positive electrode terminal through the positive electrode current collector;

a first metal plate arranged between the case and the stacked electrode assembly; and a spacer arranged between the case and the first metal plate, the spacer being composed of an insulating material, the positive electrodes being electrically connected to the case or a second metal plate arranged on the first metal plate with an insulating member, the insulating member being provided between the first metal plate and the second metal plate, and the negative electrode current collector being in contact with the first metal plate to establish electrical connection between the first metal plate and the negative electrode current collector.

Item 2

In the secondary battery described in Item 1, the negative electrode current collector and the first metal plate are welded together.

Item 3

In the secondary battery described in Item 1 or 2, negative electrode tabs extending from end portions of the negative electrodes are combined together and welded to the negative electrode current collector, and positive electrode tabs extending from end portions of the positive electrodes are combined together and welded to the positive electrode current collector.

Item 4

In the secondary battery described in any one of Items 1 to 3, the case is electrically connected to the positive electrodes, the first metal plate includes:

a first-side first metal plate arranged on a first side of the stacked electrode assembly; and a second-side first metal plate arranged on a second side of the stacked electrode assembly, the stacked electrode assembly is interposed between the first-side first metal plate and the second-side first metal plate, and the first-side first metal plate and the second-side first metal plate are connected to the negative electrode current collector.

Item 5

In the secondary battery described in Item 4, each of the first-side first metal plate and the second-side first metal plate is stacked on the negative electrode current collector in a stacking direction of the stacked electrode assembly and welded to the negative electrode current collector.

Item 6

In the secondary battery described in any one of Items 1 to 3, the first metal plate extends over the entire length of the stacked electrode assembly in a stacking direction on a side of the stacked electrode assembly adjacent to the positive electrode terminal and the negative electrode terminal.

Item 7

In the secondary battery described in any one of Items 1 to 6, each of the positive electrodes includes:

a positive electrode base; and a positive electrode active material layer arranged on the positive electrode base, each of the negative electrodes includes:

a negative electrode base; and a negative electrode active material layer, the positive electrode active material layer on the positive electrode base has a size such that the negative electrode active material layer on the negative electrode base is provided over the positive electrode active material layer, and the first metal plate is larger than the positive electrode base.

Item 8

In the secondary battery described in any one of Items 1 to 7, the spacer has a melting point of 200° C. or lower and is heat-shrinkable.

What is claimed is:

1. A secondary battery, comprising a case composed of a metal containing aluminum as a main component;

a stacked electrode assembly arranged in the case having a stacking direction, the stacked electrode assembly including positive electrodes, negative electrodes and separators, the positive electrodes and the negative electrodes being stacked with the separators provided therebetween;

a negative electrode current collector composed of a metal containing copper;

a negative electrode terminal, the negative electrodes being electrically connected to the negative electrode terminal through the negative electrode current collector;

a positive electrode current collector composed of a metal containing aluminum;

a positive electrode terminal, the positive electrodes being electrically connected to the positive electrode terminal through the positive electrode current collector;

wherein the positive electrode terminal and the negative electrode terminal are separated in a second direction crossing the stacking direction;

a first metal plate arranged between the case and the stacked electrode assembly;

a spacer arranged between the case and the first metal plate, the spacer being composed of an insulating material;

the positive electrodes being electrically connected to the case; and the negative electrode current collector being in contact with the first metal plate to establish an electrical connection between the first metal plate and the negative electrode current collector;

wherein the first metal plate includes an extending portion that extends along the stacking direction of the stacked electrode assembly to the electrical connection with the negative electrode current collector;

wherein the negative electrodes include a negative electrode tab extending from an end of the negative electrodes to an upper side adjacent to a cover plate of the case, and an area of the extending portion of the first metal plate is larger than an area of the negative electrode tab, wherein negative electrode tabs are stacked in the stacking direction to form a stacked tab member, and the stacked tab member is surrounded by the first metal plate, that is in contact with the negative electrode current collector between two ends of the first metal plate along the stacking direction, the extending portion of the first metal plate being wider in the second direction than the stacked tab member, wherein the case is electrically connected to the positive electrodes, the first metal plate is enclosed by the spacer, the first metal plate includes:
 a first-side first metal plate arranged on a first side of the stacked electrode assembly; and
 a second-side first metal plate arranged on a second side of the stacked electrode assembly, the stacked electrode assembly is interposed between the first-side first metal plate and the second-side first metal plate, the first-side first metal plate and the second-side first metal plate are connected to the negative electrode current collector, and wherein each of the first-side first metal plate and the second-side first metal plate is stacked on the negative electrode current collector in the stacking direction of the stacked electrode assembly and welded to the negative electrode current collector.

2. The secondary battery according to claim 1, wherein the negative electrode current collector and the first metal plat are welded together.

3. The secondary battery according to claim 1, wherein a plurality of negative electrode tabs each extending from end portions of the negative electrodes are combined together and welded to the negative electrode current collector, and a plurality of positive electrode tabs each extending from end portions of the positive electrodes are combined together and welded to the positive electrode current collector.

4. The second battery according to claim 1, wherein the first metal plate extends over the entire length of the stacked electrode assembly in the stacking direction on a side of the stacked electrode assembly adjacent to the positive electrode terminal and the negative electrode terminal.

5. The secondary battery according to claim 1, wherein each of the positive electrodes includes:
a positive electrode base; and
a positive electrode active material layer arranged on the positive electrode base,
each of the negative electrodes includes:
a negative electrode base; and
a negative electrode active material layer,
the positive electrode active material layer on the positive electrode base has a size such that the negative electrode active material layer on the negative electrode base is provided over the positive electrode active material layer, and
the first metal plate is larger than the positive electrode base.

6. The secondary battery according to claim 1, wherein the spacer has a melting point of 200° C. or lower and is heat-shrinkable.

7. The secondary battery according to claim 1, wherein the negative electrode current collector in contact with the first metal plate includes an upper end plate and a lower end plate portion in a substantially right angle with respect to the upper end plate portion.

8. The secondary battery according to claim 7, wherein the lower end plate portion further includes a bent portion.

9. The secondary battery according to claim 7, wherein the lower end plate portion further includes sections arranged substantially parallel with respect to each other.

10. The secondary battery according to claim 1, wherein the first metal plate includes first and second vertical portions perpendicular to the stacking direction making an electrical connection with the negative electrode current collector therebetween.

11. The secondary battery according to claim 1, wherein the negative electrode current collector is arranged in the stacked electrode assembly having a negative electrode current collector plate.

12. The secondary battery according to claim 1, wherein the positive electrode current collector is arranged in the stacked electrode assembly having a positive electrode current collector plate.

* * * * *